United States Patent
Wellman

[11] Patent Number: 5,810,544
[45] Date of Patent: Sep. 22, 1998

[54] GROUND LEVEL LOADING TRAILER

[76] Inventor: Philip Wellman, 1135 Woodside Dr., Holly Hill, Fla. 32117

[21] Appl. No.: 806,544

[22] Filed: Feb. 24, 1997

[51] Int. Cl.[6] ........................................ B60P 1/02
[52] U.S. Cl. ............................. 414/495; 280/720
[58] Field of Search ................... 414/482–485, 414/471, 495; 280/720–723

[56] References Cited

U.S. PATENT DOCUMENTS

| | | | |
|---|---|---|---|
| 2,765,941 | 10/1956 | Mamo | 414/482 |
| 2,948,548 | 8/1960 | Gill, Jr. et al. | 280/721 |
| 3,154,324 | 10/1964 | Symes | 414/483 X |
| 4,168,932 | 9/1979 | Clark | 414/483 |
| 4,490,089 | 12/1984 | Welker | 414/483 |
| 4,637,770 | 1/1987 | Swadell | 414/495 |
| 4,659,100 | 4/1987 | Welker | 280/414.1 |
| 4,685,855 | 8/1987 | Celli | 414/482 |
| 4,752,177 | 6/1988 | Zenna | 414/495 |
| 5,035,462 | 7/1991 | Page et al. | 414/495 X |
| 5,308,213 | 5/1994 | Gilbertson | 414/482 |
| 5,474,416 | 12/1995 | Rogge et al. | 414/482 |
| 5,564,883 | 10/1996 | Swanner | 414/483 |
| 5,649,802 | 7/1997 | Babcock | 414/483 |

*Primary Examiner*—David A. Bucci
*Attorney, Agent, or Firm*—Elsie C. Turner

[57] ABSTRACT

The present invention relates to a trailer having a load-bearing platform moveable between a ground-level loading position and a horizontal travel position supported on a U-shaped support frame, and having its wheels mounted on stub axles rather than a common axle. The stub axles are cantilevered on the support frame with suspension arms to keep the wheels in proper alignment with the support frame. The load-bearing platform is raised and lowered by a pivoting lever member, hinged at its rear end to the rear end of the platform, together with a block and tackle system which controls the lever member and raises and lowers the front end of the load platform.

8 Claims, 4 Drawing Sheets

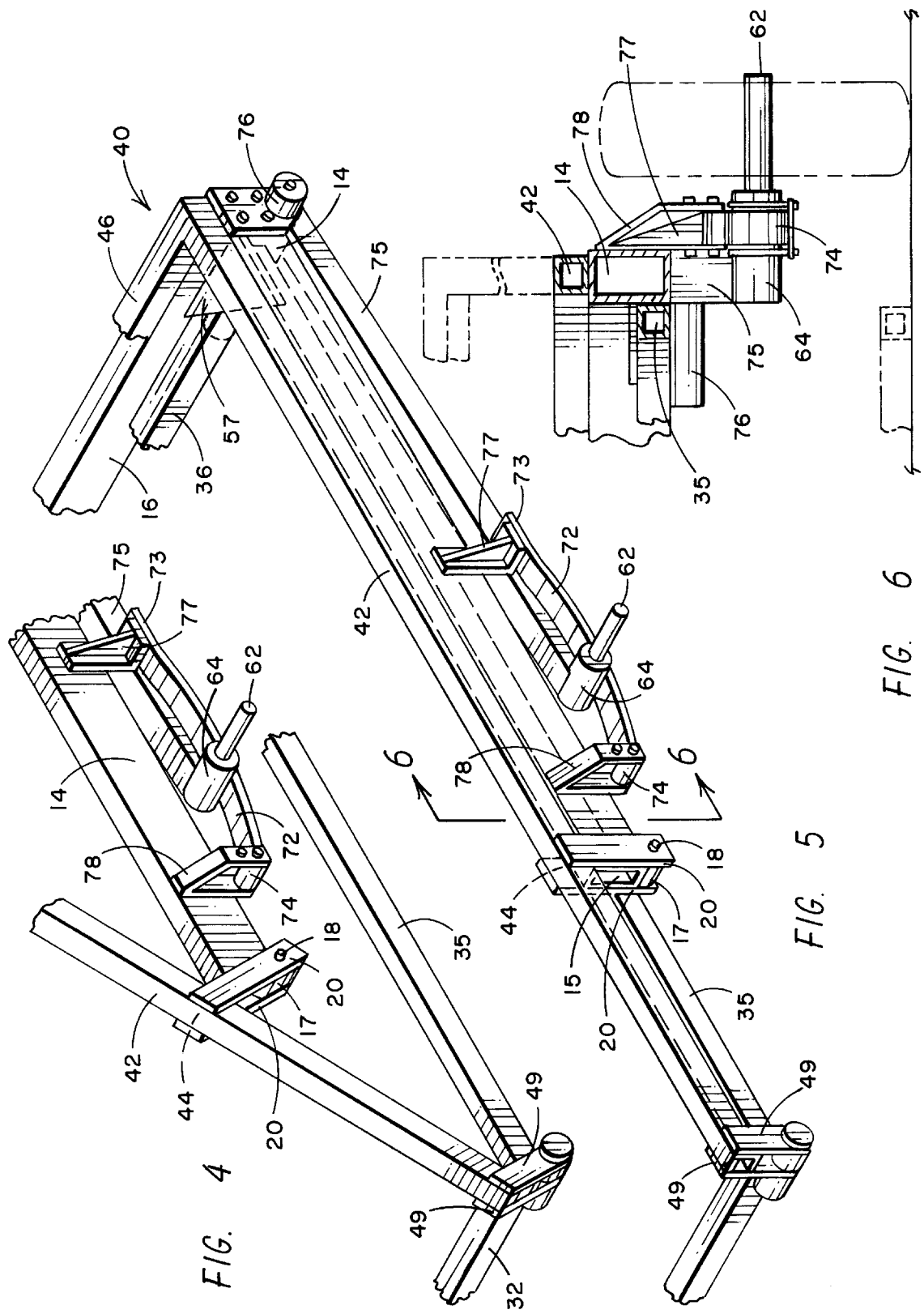

ively loaded by one person, using leverage and purchase
GROUND LEVEL LOADING TRAILER This is a formal application based on the specification and drawings filed as a provisional application on Feb. 28, 1996, Ser. No. 60/012395 of which Applicant claims the benefit.

This invention relates to a ground level loading trailer for towing wheeled means, particularly adapted for single-handed loading of heavy motorcycles.

BACKGROUND OF THE INVENTION

A number of designs for trailers which may be loaded from ground level up to a raised travel position have been developed and are known in the art. They may be grouped into two categories, one such being those which involve pushing or driving the load onto a ramp or tilting platform in order to reach the travel position above ground level, because the supporting wheels are connected by a conventional common axle which obstructs lowering of a load platform to a position flat on the ground. This type of trailer is exemplified by U.S. Pat. No. 5,051,053 to Groeneweg, U.S. Pat. No. 4,968,210 to Friederich, U.S. Pat. No. 5,016,896 to Shafer and prior art cited therein. With this type of trailer, pushing a heavy motorcycle up a ramp will typically require the strength of two or more people. Although one person might be able to drive a motorcycle up a ramp, after dismounting the problem of balancing the cycle and keeping it from rolling backwards will likely require assistance from one or more other persons. Moreover there is a danger of serious injury to those trying to load heavy wheeled vehicles on such a trailer.

Various inventions for a second category, ground level loading trailers, are known in the art. U.S. Pat. No. 4,490,089 to Welker describes a motorcycle trailer having two principal assemblies connected together in a hinged arrangement at the rear ends thereof. One of the assemblies may be lowered to rest flat almost on the round by a cooperative levering action with the other assembly, and by reversing such action the load-bearing assembly can be raised to a level position above ground. The single axle connecting the wheels does not obstruct the lowering of the load-bearing assembly because the axle has an offset movable configuration whereby a center portion thereof can be made to lie on the ground. The load-bearing platform can be lowered as far as such center portion, but can only be as wide as the center portion, which limits the load to a single motorcycle.

U.S. Pat. No. 4,659,100, also to Welker, employs the same cooperative levering action of two principal assemblies hingedly connected at their respective rear ends. However the load-bearing platform cannot lie flat on the ground unless the trailer tongue also rests on the ground. Additionally, there is no common axle, but rather each wheel is mounted on an individual stub axle. The patent does not address the potential for torsion action of the stub axles relative to the frame during travel over irregular surfaces, causing the wheels to wobble out of alignment, which is inherent in this means of wheel attachment.

U.S. Pat. No. 4,685,855 to Celli is for another two-part system employing a tilting assembly hingedly connected at its rear end to a load platform. This design forces the load-carrying bed to move forward and backward as well as up and down, requiring the entire framework not including the tongue to be longer than the load platform, with wasted space forward of the platform and a portion of the platform overhanging its rear support. Additionally the wheels are mounted on stub axles attached to the main supporting framework, but no particular attachment means is described. Thus, the potential for torsion of the stub axles relative to the frame is not addressed.

U.S. Pat. No. 5,308,213 to Gilbertson is for another ground level loading trailer employing a lever member hingedly connected at its rear end to the load platform. In order for the load-bearing platform to be lowered to ground level, the trailer tongue must tilt upward to the rear, pivoting at the point of attachment to the towing vehicle. The patent discloses a conventional ball hitch mechanism. The angle of tilt of the tongue can be no greater than the angle at which the forward lip of the means for engaging the ball is stopped by the surface on which the ball is mounted. Again, there is no common axle, and there is no provision for limiting torsion action of the stub axles with respect to the frame.

U.S. Pat. No. 4,930,799 to Pihlstrom et al. describes another dual element trailer wherein the load is placed on a pallet lying flat on the ground behind the main trailer frame. The main frame is tiltable and supported by wheels mounted on a conventional common axle. When the frame is in its tilted position, it becomes a ramp onto which the pallet is drawn by means of a hand-operated winch. When the pallet is aligned properly on top of the frame, the frame is pivoted to a horizontal travel position. This design does not present a torsion problem due to the common axle. However, there are some drawbacks to this invention: the fact that more room is required to accommodate the pallet when it is on the ground behind the main frame, and the lack of levering action at the rear end of the load platform to improve mechanical advantage. The heaviest loads probably could not be pulled up the ramp with a hand-operated winch.

Accordingly it is an object of this invention to provide a ground level loading trailer whereby a heavy motorcycle can be easily loaded by one person, using leverage and purchase means.

It is a further object of this invention to provide such a trailer with a suspension system for permitting the raising and lowering of a load platform within the main frame, by having no common axle but rather stub axles for each wheel, such suspension system being designed to eliminate or minimize torsion action of the stub axles relative to the frame, thereby keeping the wheels properly aligned with the trailer frame.

It is a further object of this invention to provide a compact design with no need for fore and aft telescoping of parts which would require a lot of additional space for loading and unloading.

SUMMARY OF THE INVENTION

A ground level loading trailer according to the present invention comprises a U-shaped support frame with supporting wheels mounted on stub axles suspended from the support frame with anti-torque means to keep the wheels in proper alignment. A load bearing platform is moveable between a ground level loading position and a horizontal travel position with the support frame. Lifting means for raising and lowering the platform comprises a pivoting lever member hinged at its rear end to the rear end of the platform, and cable means for moving both the front end of the lever member up and down between a tilted position spaced above the frame to a horizontal position adjacent the frame, and the front end of the load platform up and down between the ground and a horizontal position within the frame, whereby the rear end of the platform is also moved between ground level and frame by the pivoting movement of the lever member.

BRIEF DESCRIPTION OF THE DRAWINGS

FIG. 4 is a partial exploded perspective view of a portion of lever means for elevating the rear end of the trailer's load platform, and the trailer's suspension means;

FIG. 5 is another partial exploded perspective view showing the lever means pivoted to the traveling position with the load platform raised, together with the suspension means;

FIG. 6 is a vertical section view taken along line 6—6 of FIG. 5 and including a phantom wheel;

DETAILED DESCRIPTION OF THE PREFERRED EMBODIMENTS

Figure 1:
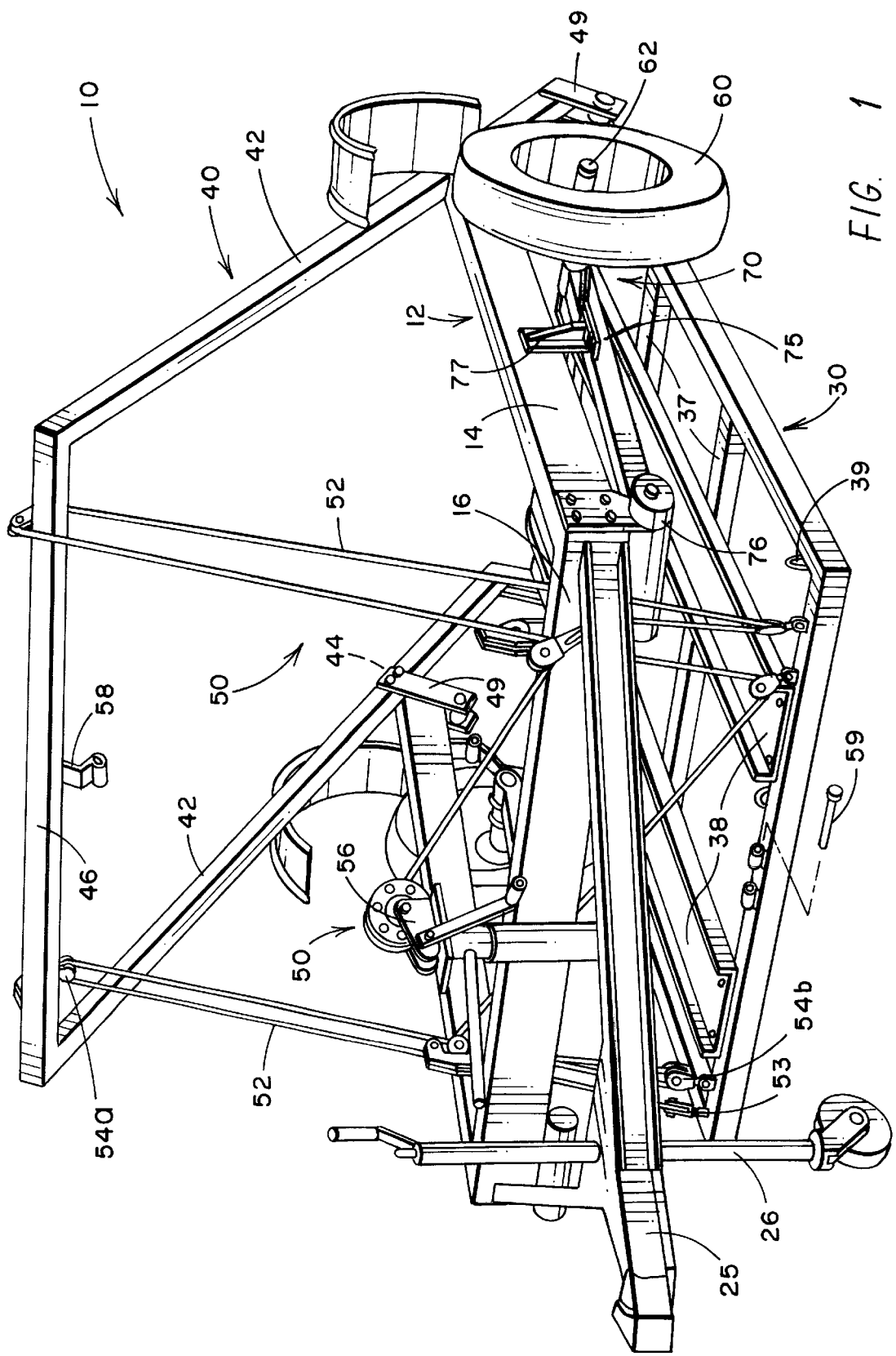
FIG. 1 is is a front perspective view of the ground-level loading trailer.

Referring to FIGS. 1 through 7, a ground-level loading trailer 10 is shown having a U-shaped main frame 12 with a closed front end and open rear ends; a conventional tongue assembly 25 with conventional retracting wheel-and-post support means 26, attached to the front end of main frame 12; a load platform member 30; a lever member comprising a U-shaped frame 40 with closed front end and open rear ends, journaled at its sides to the rear ends of main frame 12, journaled at its rear ends to the rear end of rectangular platform member 30, and movably connected at its front and by lifting and lowering means 50, such as a block and tackle system or hydraulic mechanism, to both the front :end of platform 30 and the front end of frame 12; and at least one pair of wheels 60 rotating on short axles or spindles 62 connected to the sides of frame 12 through a pair of suspension assemblies 70.

Referring particularly to FIGS. 1, 4 and 5, it can be seen that the perimeter frame 12 has side beams 14 interconnected by forward beam 16. Each rear end 15 of each side beam 14 has affixed thereto a cylindrical member 17 through which a clevis pin 18 rotates, pivotally securing to said ends 15 a pair of flat bracket members 20 forming a clevis means with, and fixedly attached to, each side beam 42 of lever member 40. The pivot point, or attachment point 44 of bracket members 20, on each side beam 42 is disposed so that the front-end beam 46 of lever member 40 rests atop and is aligned with the front end beam 16 of main frame 12 when lever member 40 is pivoted to a horizontal position, front-end beams 46 and 16 being the same length. Rear ends 48 of side beams 42 have bracket members 49 affixed thereto forming clevis means, allowing lever member 40 to pivot on clevis pins 33 rotating in cylindrical members 34 fixed at either end of rear-end beam 32 of platform 30.

Figure 2:
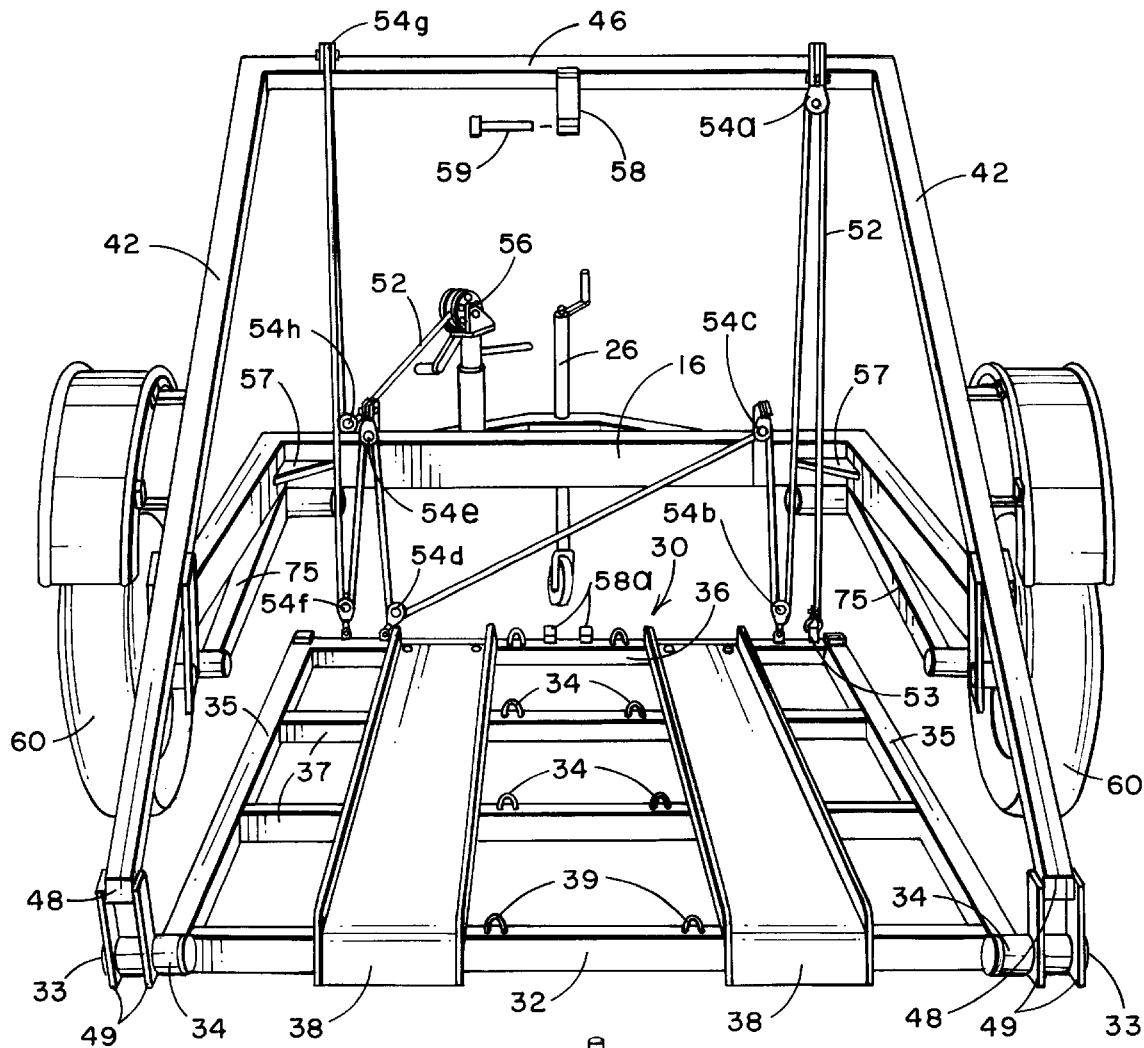
FIG. 2 is a rear perspective view of the trailer showing its loading mode.
Figure 3:
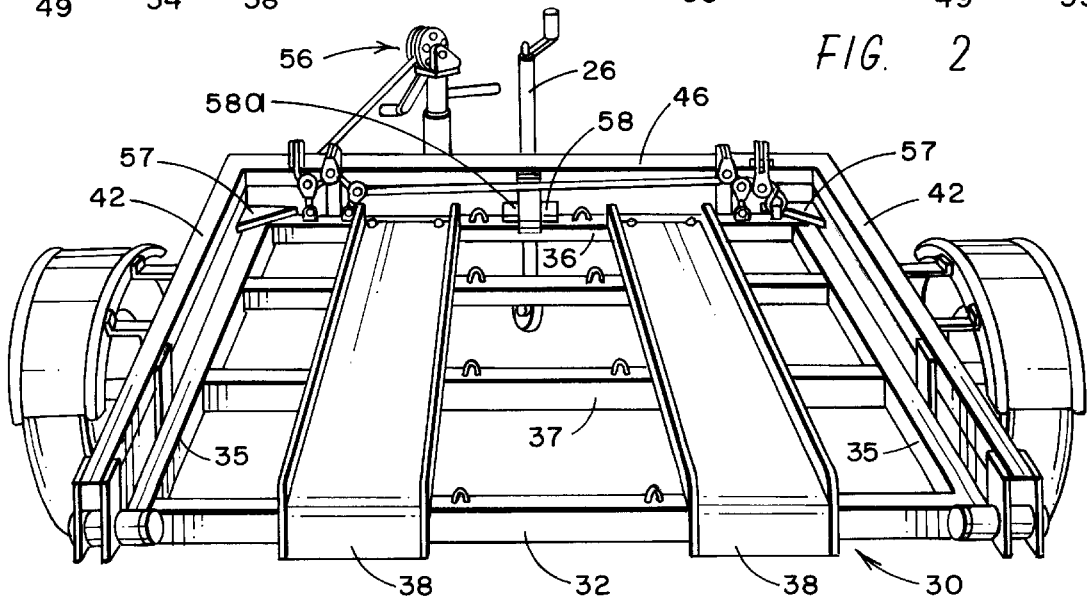
FIG. 3 is a view like FIG. 2 but showing the trailer's travelling mode.

FIGS. 1, 2, and 3 show load platform 30 as a rectangular framework formed by side beams 35, rear beam 32, front-end beam 36, and cross beams 37 connecting side beams 35 intermediate the front and rear ends thereof. Running fore and aft on top of the framework are affixed at least two elongated load pallets 38, shown with raised side edges which serve as appropriate guides when loading and transporting motorcycles. A plurality of tie-down eyelets 39 are shown fixed at appropriate locations on beams 32, 35 and 37 to accommodate fastening ropes or straps to secure a load to the platform.

FIGS. 1, 2, and 3 also illustrate one possible lifting means 50 by which the front end of load platform 30 is raised to its horizontal transport position from ground level, and the front end of lever member 40 is lowered, to the level of frame 12, thereby lifting the rear end of platform 30 to the same level. One end of a length of cable or heavy duty braided rope 52 is affixed to a tie-down eyelet 53 affixed to beam 36 near one end thereof. The other end of the cable is then led in sequence through block 54a affixed to beam 46 near the end thereof, approximately directly above loop 53; is then passed vertically down and through block 54b affixed to beam 36 spaced slightly inboard from loop 53; is then passed vertically up and through block 54c affixed to beam 16 of frame 12 near the end thereof above block 54b; is then passed diagonally downward to another block 54d on beam 36, spaced inboard from its other end; is then passed vertically upward to another block 54e fixed to beam 16 near the other end thereof; is then passed vertically down to and through block 54f on beam 36 spaced outboard from block 54d; is then passed vertically upward to and through block 54g affixed to beam 46 near the other end thereof; is then passed vertically down to block 54h affixed to beam 16 directly beneath block 54g; and is then passed horizontally forward and wound onto a conventional winch, crank, and spool mechanism 56 fixed to trailer tongue 25. Winch mechanism 56 could be either manually or electrially operated. Winding up cable 52 onto winch mechanism 56 pulls beam 46 down toward beam 16 and raises beam 36 up inside frame 12 until it is stopped by flanges 57 inside the front end corners of frame 12. The lowering of beam 46 causes lever member 40 to pivot, thereby raising rear beam 32 of platform 30. The two ends of platform 30 do not rise simultaneously unless the weight of the load it bears is distributed equally vis-a-vis its fore and aft ends. If the cargo is heavier in front than in the rear, lever member 40 will pivot first until beam 46 is down as far as it will go, atop beam 16, thus raising the rear beam 32. Continued operation of the winch mechanism then raises beam 36 of platform 30. If the load on platform 30 is heavier in the back, then the front end-beam 36 of platform 30 rises first before lever member 40 pivots and raises rear-end beam 32. Either way, the two-step lifting of platform 30 increases mechanical advantage and reduces the effective weight of the load being lifted at each step.

Once lever member 40 and platform 30 are in transport mode, parallel to frame 12, locking members 58 and 58a affixed to the center points of beam 46 and beam 36, respectively, are secured together by insertion of a pin 59, so that lever member 40 and platform 30 are locked together for transport. It can be seen that beams 36 and 46 are thereby also locked to frame 12 because flanges 57 are sandwiched therebetween.

To lower load platform 30, pin 59 is removed from locking members 58 and 58a, and cable 52 is unwound gradually from the winch mechanism 56. Distribution of the weight of the load on platform 30 will determine whether its rear end is lowered first as the front beam 46 of lever member 40 rises, or its front end is lowered first.

The entire invention 10 is supported at three points. In front, the front end of the trailer tongue either is borne on a conventional trailer hitch attached to a motor vehicle, not shown, or when disconnected from a vehicle, rests on an attached conventional retractable post and wheel assembly 26. At the sides, the trailer is supported by at least one pair of opposing wheels 60 each of which turns on a short spindle 62 inserted in a cylindrical boss 64 connected to frame 12 through suspension means 70 on either side of frame 12.

Suspension means 70 is comprised of a conventional carriage spring member 72 supporting roughly one-half of the length of cylindrical boss 64, the other half of boss 64 being affixed to the rearward end of suspension arm 75, which is aligned directly beneath side beam 14 of frame 12. The forward end of each suspension arm 75 is journaled to the underside of the front corners of frame 12 by pin-and-cylinder mechanisms 76, at the junctions of front beam 16 with side beams 14 of the frame, so that suspension arms 75 may pivot up and down to a limited extent in response to bumps in the road while traveling. Each carriage spring member 72 is affixed at its forward end 73 to side beam 14 with a bracket member 77, and is journaled at its rear end 74 to a clevis-like bracket 78 affixed to side beam 14, so that carriage spring member 72 is aligned alongside and outboard of suspension arm 75. It should be noted that suspension arms 75 hold the wheels 60 in alignment, and the load platform 30 is offset from frame 12 and carriage spring members 72. The carriage spring members 72 thus counter any torque about the longitudinal axes of suspension arms 75 resulting from the cambering tendency of wheels 60. This suspension system makes it possible to do without conventional single axle connection of the wheels 60.

Figure 7:
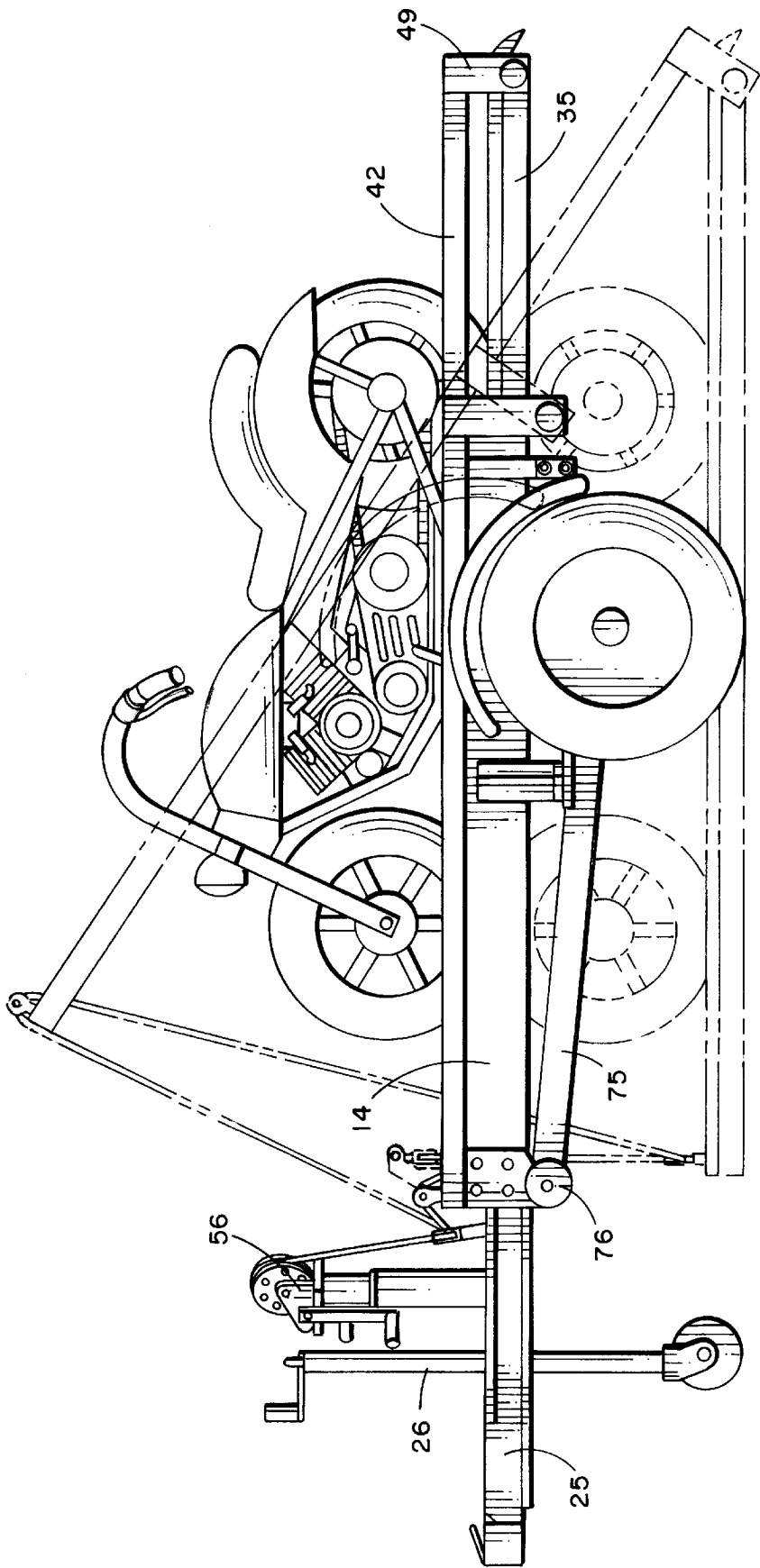
FIG. 7 is a side elevational view showing the trailer with a load in the travelling mode; shown in phantom is the trailer with load in the loading position.

FIG. 7 shows the invention 10 in its transport mode, the load platform 30 obscured by frame 12 forward of the pivot points of lever member 40 on frame 12. Also shown, in phantom, is the invention 10 in loading mode, with load platform 30 resting on the ground and lever member 40 in its tilted position.

To utilize this invention for hauling a heavy motorcycle, golf cart, lawn mower or other such wheeled item, only one person is needed to load it. The cycle is driven or pushed onto one of the pallets 38 and is secured with tie-down straps or the like to tie-down eyelets 39. The winch mechanism 56 is operated to lower the front end of lever member 40 and raise the load platform 30 to the traveling position, nested inside frame 12, and lever member 40 and the load platform 30 are secured to each other with locking members 58 and 58a and locking pin 59.

Various changes and departures may be made to the invention without departing from the spirit and scope thereof. For instance, a hydraulic lifting means could be substituted for a winch mechanism, without changing the nature or function of the invention. Thus it is not intended that the invention be limited to what is described in the specification and illustrated in the drawings, rather only as set forth in the claims.

What is claimed is:

1. In combination with a ground-level-loading trailer apparatus comprising a generally U-shaped perimeter support frame having a closed front end and an open rear end; a load-bearing platform movable between a loading position on the ground and a raised horizontal travel position within said support frame; lifting means for raising and lowering said platform between said loading position and said travel position; hitch means for attaching said trailer to a towing vehicle; and ground-engaging wheel means supporting said support frame above ground, said wheel means mounted on individual stub axles for rotational movement:

a suspension system for connecting said stub axles to said support frame, said suspension system comprising:
   a pair of suspension arms each arm having a front portion and a rear portion, each said rear portion being fixedly connected by boss means to one said stub axle, said boss means being suspended from a side of said frame by spring means, and said arm journaled at its front end to said front end of said support frame, whereby torsion of said axles relative to said frame, in response to varying road conditions during travel, is minimized.

2. The apparatus according to claim 1 wherein said support frame is comprised of a front crossbeam connecting a pair of side beams, each of said side beams having a front end and a rear end, the front end of each side arm being journaled to said crossbeam adjacent its connection to a side beam, and each spring means supporting boss means and a stub axle being disposed at a point intermediate of said front and rear ends of one said side beam.

3. The apparatus according to claim 2 wherein said spring means comprises carriage spring means attached at each end thereof by bracket means affixed exteriorly to one said side beam, and each said boss means resting on one said carriage spring, whereby said carriage spring means is offset exterior to said side beam, said brackets limit outward lateral motion of said suspension arms, and said wheels are kept in proper alignment.

4. A ground level loading trailer comprising:

a generally U-shaped perimeter support frame having a front crossbeam attached at each end thereof to a pair of side beams, said side beams each having a forward portion and a rear portion;

ground engaging wheels for supporting said support frame above the ground, each wheel mounted on a separate stub axle for rotational movement;

a suspension system connecting said stub axles to the side beams of said support frame, said system comprising a pair of arms each pivotally attached at one end thereof to the front crossbeam adjacent its connection to one said side beam, the other end of each arm being connected to one said stub axle by mounting means, said axle being suspended from said side beam intermediate said forward and rear portions thereof by spring means, whereby torsion of said stub axles relative to said support frame is minimized;

a load-bearing platform having a forward end and a rear end and movable between a ground-level loading position and a raised horizontal travel position within said support frame;

a lifting assembly for raising and lowering said platform, said assembly comprising a generally U-shaped lever member pivotable between a raised horizontal travel position adjacent said support frame and a tilted ground-loading position, said lever member having a front crossbeam connecting a pair of arms each having a front portion, a rear portion and a fulcrum point intermediate said front and rear portions, each said arm pivotally connected at its fulcrum point to said rear portion of one said side beam of said support frame, said rear portion of each said arm being pivotally interconnected by said rear end of said platform to move as a unit for lifting and lowering the rear end of said platform, and raising and lowering means interconnecting said front crossbeam of said lever member, said front end of said platform, and said front beam of said support frame, whereby lowering said crossbeam pivots said lever member to its horizontal position and raises said platform to its travel position, and raising said crossbeam lowers both ends of said platform to ground level;

locking means for securing said platform in its raised travel position within said support frame, and for securing said lever member adjacent said support frame in its horizontal travel position;

hitch means affixed to said front beam of said support frame for removably attaching said trailer to a towing vehicle.

5. A ground level loading trailer comprising:

a generally U-shaped perimeter support frame having a closed front end, an open rear end and a pair of sides;

a lever member comprising a framework having a front end, a rear end, and side arms pivotally connected to the rear end of said support frame, for pivotal movement between a tilted ground-loading position and a raised horizontal position, with said front end being spaced above said front end of said support frame and its rear end at ground level when in the tilted position, and said lever member being adjacent said support frame in the horizontal position;

a load-bearing platform movable between a loading position on the ground and a raised horizontal travel position within said support frame, said platform having a front end and a rear end, said rear end pivotally connected to the rear end of said lever member;

raising and lowering means interconnecting said front end of said lever member and said front end of said platform to said front end of said support frame, whereby lowering said front end of said lever member pivots it to its horizontal position and raises said platform at both ends thereof to said travel position within said support frame;

locking means for securing said platform and lever member to said support frame in the travel position;

wheel means mounted on individual stub axles for rotational movement and support of said trailer;

suspension means for connecting said stub axles to said support frame whereby torsion of said stub axles relative to said frame, responsive to varying road conditions during travel, is minimized; and hitch means for connecting said front end of said support frame to a towing vehicle.

6. The apparatus according to claim 5 wherein said suspension system comprises a pair of suspension arms each having a front portion and a rear portion, each said front portion being journaled to said front end of said support frame, and each said rear portion affixed to boss means into which one said stub axle is mounted, said boss means being suspended from a side of said support frame by spring means.

7. The apparatus according to claim 6 wherein said spring means comprises leaf spring means attached at each end thereof to one said side of said support frame, on which said leaf spring rests said boss means.

8. The apparatus according to claim 7 further comprising bracket means supporting said carriage springs at either end thereof, said bracket means affixed to the exterior sides of said support frame whereby said carriage springs are offset from said support frame, and said brackets limit lateral outward motion of said suspension arms.

* * * * *